(12) United States Patent
Seki et al.

(10) Patent No.: US 11,201,687 B2
(45) Date of Patent: Dec. 14, 2021

(54) OPTICAL TRANSMISSION SYSTEM AND WAVELENGTH ALLOCATION METHOD

(71) Applicant: Nippon Telegraph and Telephone Corporation, Tokyo (JP)

(72) Inventors: Toshihiko Seki, Tokyo (JP); Osamu Okino, Tokyo (JP); Hiroyuki Oyanagi, Tokyo (JP); Mizuto Nakamura, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/268,831

(22) PCT Filed: Aug. 8, 2019

(86) PCT No.: PCT/JP2019/031396
§ 371 (c)(1),
(2) Date: Feb. 16, 2021

(87) PCT Pub. No.: WO2020/039965
PCT Pub. Date: Feb. 27, 2020

(65) Prior Publication Data
US 2021/0194617 A1 Jun. 24, 2021

(30) Foreign Application Priority Data
Aug. 22, 2018 (JP) .............................. JP2018-155249

(51) Int. Cl.
*H04J 14/02* (2006.01)
*H04B 10/25* (2013.01)
(Continued)

(52) U.S. Cl.
CPC .......... *H04J 14/0241* (2013.01); *G06F 16/22* (2019.01); *H04B 10/25* (2013.01); *H04B 10/27* (2013.01); *H04J 14/021* (2013.01)

(58) Field of Classification Search
CPC ..... H04B 10/25; H04B 10/27; H04J 14/0241; H04J 14/021
See application file for complete search history.

(56) References Cited

U.S. PATENT DOCUMENTS 5,212,577 A * 5/1993 Nakamura ............. H04B 10/50
398/42
6,973,269 B1 * 12/2005 Britz ................... H04J 14/0227
398/51
(Continued)

FOREIGN PATENT DOCUMENTS

JP 2012-005088 * 1/2012 ............. H04L 12/42

OTHER PUBLICATIONS

[No Author Listed], "Data Sheet 1FINITY L100 Lambda Blade," Fujitsu Limited, 2018, 3 pages.
(Continued)

*Primary Examiner* — Li Liu
(74) *Attorney, Agent, or Firm* — Fish & Richardson P.C.

(57) ABSTRACT

[Problem] In a disaggregated optical transmission system formed by connecting bases including transmission apparatuses having specifications of different vendors through an optical fiber, wavelength information is easily set in the transmission apparatuses at both bases of the optical fiber such that the required wavelength is assigned to the optical fiber.
[Solution] The optical transmission system 30 includes a facility DB 34 that stores at least information on the NW configuration in which a predetermined optical signal wavelength is assigned to the optical fiber 17, a wavelength assignment unit 32f that, if the facility DB 34 stores no information on the same NW configuration as a NW configuration that the wavelength assignment request to the optical fiber 17 between bases has, associates a management number with a wavelength commonly available for different
(Continued)

vendors, based on vendor information in which management numbers and wavelengths of vendors are associated, and further if this wavelength is assignable to the optical fiber 17, performs a wavelength assignment instruction by using the management number, and a wavelength setting unit 33 that performs wavelength assignment setting in the transmission apparatuses at both bases of the optical fiber 17 in response to the wavelength assignment instruction.

4 Claims, 10 Drawing Sheets

(51) Int. Cl.
  *G06F 16/22* (2019.01)
  *H04B 10/27* (2013.01)

(56) References Cited

U.S. PATENT DOCUMENTS

| | | | |
|---|---|---|---|
| 8,515,280 B1* | 8/2013 | Li | H04J 14/021 398/58 |
| 2001/0012141 A1* | 8/2001 | Takai | H04J 14/0227 398/7 |
| 2003/0016414 A1* | 1/2003 | Solheim | H04J 14/0283 398/82 |
| 2003/0099014 A1* | 5/2003 | Egner | H04J 14/0241 398/79 |
| 2017/0353246 A1* | 12/2017 | Frankel | H04B 10/40 |

OTHER PUBLICATIONS

Juniper.net, [online], "BTI7800 Series Hardware Overview and Installation Guide," Mar. 13, 2017, retrieved on Jul. 11, 2018, retrieved from URL<https://www.juniper.net/documentation/en_US/bti-series/bti7800/topics/reference/general/r-7800-cliref-optical-layer-wavelength-plan.html>, 6 pages.

Pr.fujitsu.com, [online], "Significantly expand the lineup of optical transmission system "1FINITY" series," Mar. 23, 2016, retrieved on Jul. 11, 2018, retrieved from URL<http://pr.fujitsu.com/jp/news/2016/03/23.html>, 9 pages (with English Translation).

Tech.nikkeibp.co.jp, [online], "Easy-to-understand lectures Familiar optical network (15)," Jun. 15, 2006, retrieved on Jul. 11, 2018, retrieved from URL<http://tech.nikkeibp.co.jp/it/article/COLUMN/20060607/240199/?rt=nocnt>, 11 pages (with English Translation).

* cited by examiner

FREQUENCY AT 50.0 GHZ INTERVALS (UNIT: nm)

| MANAGEMENT NUMBER | COMPANY A | COMPANY B | COMPANY C | COMPANY D | COMPANY E | COMPANY F |
|---|---|---|---|---|---|---|
| #1 | 1566.72 | 1566.72 | 1528.77 | 1528.77 | 1528.77 | 1608.76 |
| #2 | 1566.31 | 1566.31 | 1529.16 | 1529.16 | 1529.55 | 1608.65 |
| #3 | 1565.91 | 1565.91 | 1529.55 | 1529.55 | 1530.33 | 1608.54 |
| #4 | 1565.50 | 1565.50 | 1529.94 | 1529.94 | 1531.12 | 1680.44 |
| ◄----► | ◄----► | ◄----► | ◄----► | ◄----► | ◄----► | ◄----► |
| #93 | 1529.94 | 1529.94 | 1565.50 | 1565.50 | 1564.27 | 1598.89 |
| #94 | 1529.55 | 1529.55 | 1565.90 | 1565.90 | 1565.09 | 1598.79 |
| #95 | 1529.16 | 1529.16 | 1566.31 | 1566.31 | 1565.90 | 1598.68 |
| #96 | 1528.77 | 1528.77 | 1566.72 | 1566.72 | 1566.72 | 1598.57 |

| | |
|---|---|
| | 1529.55 |
| | 1529.94 |

Fig. 9

OPTICAL TRANSMISSION SYSTEM AND WAVELENGTH ALLOCATION METHOD

CROSS-REFERENCE TO RELATED APPLICATIONS

This application is a National Stage application under 35 U.S.C. § 371 of International Application No. PCT/JP2019/031396, having an International Filing Date of Aug. 8, 2019, which claims priority to Japanese Application Serial No. 2018-155249, filed on Aug. 22, 2018. The disclosure of the prior application is considered part of the disclosure of this application, and is incorporated in its entirety into this application.

TECHNICAL FIELD

The present disclosure relates to a disaggregated optical transmission system and a wavelength assignment method that manage wavelengths assigned to an optical fiber between bases including transmission apparatuses having different specifications for respective vendors.

BACKGROUND ART

Currently, when performing communication between bases, an all-in-one optical transmission system 10 illustrated in FIG. 5 is applied. In this optical transmission system 10, two bases, which are an A building 11 and a B building 12, each include a communication unit 16 in which a plurality of transponders (TRD) 13a and 13b, a Multiplexer (MUX)/DeMUX (DMUX) 14, and an optical cross-connect (OXC) 15 are accommodated in combination with each other, and the OXCs 15 of the A building 11 and the B building 12 are connected through an optical fiber 17. The communication unit 16 is a transmission apparatus that transmits optical signals of a predetermined wavelength to the optical fiber 17.

In the optical transmission system 10, all the TRDs 13a and 13b, MUX/DMUX 14, and OXC 15 that are accommodated in the communication units 16 of the A building 11 and the B building 12 have specifications of the same vendor V.

The OXC 15 is an apparatus that can freely set an optical communication path for data transmission in the optical fiber 17 through switching. In this OXC 15, even in a case where there are data transmission paths whose formats are different for each use or each transmission speed of communication, data signals can be output to different paths.

The TRDs 13a and 13b are relay apparatuses that are connected to communication devices such as a personal computer (PC), a router, a switch, or the like of a user not illustrated in the drawings, and desired communication devices (not illustrated) can communicate with each other between the A building 11 and the B building 12 through the TRDs 13a and 13b.

In the MUX/DMUX 14, the MUX multiplexes a plurality of signals into one signal and outputs the signal, and the DMUX splits one signal into a plurality of signals and outputs the plurality of signals.

A description will be provided for a case in which the wavelengths of the plurality of optical signals transmitted to the optical fiber 17 between the A building 11 and the B building 12 are managed in the all-in-one optical transmission system 10.

As illustrated in FIG. 6, the optical transmission system 10 further includes a wavelength management unit 32A that manages wavelengths used by the vendor V according to their corresponding management number, a wavelength setting unit 33 that sets information on a wavelength to be managed in a communication unit 16 which is a transmission apparatus such that the wavelength is assigned to the optical fiber 17, and a management table 32T. In the optical transmission system 10, optical signals of wavelengths assigned to the optical fiber 17 are transmitted between the communication units 16 of the buildings 11 and 12.

Note that the wavelength management unit 32A is configured using a Network Management System (NMS), an Operation Support System (OSS), or the like. The wavelength setting unit 33 is configured using an Element Management System (EMS).

The wavelength setting unit 33 is connected to the communication units 16 of the buildings 11 and 12 by a control line such as an optical fiber. Here, the wavelength setting unit 33 is connected to a MUX 14a in the communication unit 16 of the A building 11 and Laser Diodes (LDs) 1a to 1d respectively emitting optical signals of different wavelengths $\lambda 1$ to $\lambda 4$, and is connected to a DEMUX 14b in the communication unit 16 of the B building 12 and Photodiodes (PDs) 2a to 2d respectively receiving optical signals of different wavelengths $\lambda 1$ to $\lambda 4$.

The management table 32T holds the management numbers corresponding to wavelengths used by the vendor V. For example, the management number #1 is associated with the wavelength $\lambda 1$, the management number #2 is associated with the wavelength $\lambda 2$, the management number #3 is associated with the wavelength $\lambda 3$, and the management number #4 is associated with the wavelength $\lambda 4$.

The wavelength management unit 32A designates the wavelengths to be assigned to the optical fiber 17 by one of management numbers #1 to #4 in the management table 32T. This designation is performed, for example, in response to an operation by the operator. The wavelength management unit 32A outputs the designated management number (for example, the management number #1) to the wavelength setting unit 33.

The wavelength setting unit 33 refers to the management table 32T to search for the wavelength $\lambda 1$ associated with the management number #1, when the management number #1 is input from the wavelength management unit 32A. Further, the wavelength setting unit 33 outputs a setting instruction for setting the wavelength information in the communication unit 16 to the LD1a and MUX 14a of the A building 11 as well as the DEMUX 14b and PD 2a to 2d of the B building 12 such that the retrieved wavelength $\lambda 1$ is assigned to the optical fiber 17.

This allows a wavelength $\lambda 1$ to be assigned to the communication units 16 of the buildings 11 and 12, which enables communication between the communication units 16 of the buildings 11 and 12 with an optical signal having the wavelength $\lambda 1$ via the optical fiber 17. Other wavelengths $\lambda 2$ to $\lambda 4$ are similarly assigned to enable communication.

In recent years, Over The Top (OTT) has been a service that provides multimedia such as video streaming, a voice call, and a social networking service (SNS) via the Internet. The opening of optical transmission systems has progressed under the lead of this OTT. Thus, in place of the all-in-one optical transmission system in the related art, a disaggregated optical transmission system described below has received attention.

Next, the disaggregated optical transmission system is configured to provide communication services in a flexible and speedy manner by separating and combining various functions such as a transport function, a Wavelength Division Multiplexing (WDM) function, a switch function, and an access function that are constituent elements of the all-in-one optical transmission system.

FIG. 7 illustrates one configuration example of the disaggregated optical transmission system 20. In the optical transmission system 20, the A building 11 and the B building 12 each deploy a communication unit 16a in which a plurality of TRD 13a and 13b are accommodated, and a communication unit 16b in which a MUX/DMUX 14 and a ROADM 18 are accommodated, and the ROADMs 18 of the A building 11 and the B building 12 are connected by the optical fiber 17. Further, the TRDs 13a and 13b of the communication unit 16a and the MUX/DMUX 14 of the communication unit 16b are connected by optical fibers 17a and 17b. Both the MUX/DMUX 14 and the ROADM 18 have functions corresponding to the OXC 15. The communication units 16a and 16b are the transmission apparatuses described above.

In the disaggregated optical transmission system 20, the TRD 13a has different vendor specifications from those of the MUX/DMUX 14 and the ROADM 18 such that the MUX/DMUX 14 and the ROADM 18 have specifications of the vendor V1, and the TRD 13a has specifications of the vendor V2.

The ROADM 18 drops or adds an optical signal as it is and performs a multiplexing process. The ROADM 18 has a function substantially equivalent to a Wavelength Division Multiplexing (WDM) function of simultaneously carrying a plurality of optical signals with different wavelengths on one optical fiber.

Non Patent Literatures 1 to 4 disclose technologies relating to the disaggregated optical transmission system.

CITATION LIST

Non Patent Literature

Non Patent Literature 1: "Expansion of Line-up of Optical Transmission System '1FINITY' series", [online], Fujitsu Corporation, Mar. 23, 2016, [retrieved on Aug. 3, 2018], Internet <URL: http://pr.fujitsu.com/jp/news/2016/03/23.html#footnote6>
Non Patent Literature 2: Hagimoto Kazuo and two others, "Quick Understanding Lecture Optical Network Coming Close (15)", [online], Nikkei Communication, Jun. 15, 2006 [retrieved on Aug. 3, 2018], Internet <http://tech.nikkeibp.co.jp/it/article/COLUMN/20060607/240199/?rt=nocnt>
Non Patent Literature 3: "1FINITY L100 Lambda Blade", [online], Fujitsu Co., Ltd., [retrieved on Aug. 3, 2018], Internet <https://walkerfirst.com/uploads/files/literature/Fujitsu %201FINITY %20L100.pdf>
Non Patent Literature 4: "BTI7800 Series Hardware Overview and Installation Guide—TechLibrary—Juniper Networks", [online], Juniper, [retrieved on Aug. 3, 2018]; Internet <https://www.juniper.net/documentation/en_US/bti-series/bti7800/topics/reference/general/r-7800-cliref-optical-layer-wavelength-plan.html>

SUMMARY OF THE INVENTION

Technical Problem

The above-described disaggregated optical transmission system 20 further includes a wavelength management unit 32A, wavelength setting units 33a and 33b, and management tables 32T1 and 32T2, as illustrated in FIG. 8, for managing the wavelengths of a plurality of optical signals that are assigned to the optical fiber 17 between the A building 11 and the B building 12.

One wavelength setting unit 33a belongs to the vendor V1 and is connected to the MUX 14a in the communication unit 16b of the vendor V1 of the A building 11 and the DEMUX 14b in the communication unit 16b of the vendor V1 of the B building 12 by a control line such as an optical fiber.

The other wavelength setting unit 33b belongs to the vendor V2 and is connected to the LDs 1a to 1d in the communication unit 16a of the vendor V2 of the A building 11 and the PDs 2a to 2d in the communication unit 16a of the vendor V2 of the B building 12 by control lines.

The management table 32T1 belongs to the vendor V1 and holds management numbers corresponding to wavelengths used by the vendor V1. Here, the management number #1 is associated with the wavelength $\lambda 1$, and the management number #2 is associated with the wavelength $\lambda 2$, and the management number #3 is associated with the wavelength $\lambda 3$, and the management number #4 is associated with the wavelength $\lambda 4$.

The management table 32T2 belongs to the vendor V2 and holds management numbers corresponding to wavelengths used by the vendor V2. Here, the management number #4 is associated with the wavelength $\lambda 1$, and the management number #3 is associated with the wavelength $\lambda 2$, and the management number #2 is associated with the wavelength $\lambda 3$ and the management number #1 is associated with the wavelength $\lambda 4$.

The management tables 32T1 and 32T2 have different correspondences between the wavelength $\lambda$ and the management number #. Thus, when the wavelength information is set in the transmission apparatus to assign the wavelength $\lambda 1$ to the optical fiber 17 between the buildings 11 and 12, the operator needs to check the management table 32T1 for the vendor V1 and the management table 32T2 for the vendor V2 and perform a setting operation by using the wavelength management unit 32A.

For example, it is necessary to perform a setting operation that designates a management number #1 associated with the wavelength $\lambda 1$ of the management table 32T1 for the MUX 14a of the A building 11 and the DEMUX 14b of the B building 12, and a management number #4 associated with the wavelength $\lambda 1$ of the management table 32T2 for the LDs 1a to 1d of the A building 11 and the PDs 2a to 2d of the B building 12.

In response to the setting operation, the wavelength setting unit 33a of the vendor V1 refers to the management table 32T1 to search for the wavelength $\lambda 1$ associated with the management number #1, and outputs the setting instruction for the information on the retrieved wavelength $\lambda 1$ to the MUX 14a and the DMUX 14b. The wavelength setting unit 33b of the vendor V2 refers to the management table 32T2 to search for the wavelength $\lambda 1$ associated with the management number #4, and outputs the setting instruction for the information of the retrieved wavelength $\lambda 1$ to the LDs 1a to 1d and the PDs 2a to 2d.

This allows information on the wavelength $\lambda 1$ to be set in the communication units 16a and 16b of the buildings 11 and 12, which enables communication between the buildings 11 and 12 with an optical signal having the wavelength $\lambda 1$ transmitted to the optical fiber 17. Other wavelengths $\lambda 2$ to $\lambda 4$ are similarly assigned to enable communication.

However, as described above, the operator needs to check the management table 32T1 for the vendor V1 and the management table 32T2 for the vendor V2 and perform a setting operation of assigning wavelengths by using the wavelength management unit 32A, so that there is a problem that the setting of the wavelength information (also referred to as a wavelength setting) becomes complicated.

A complex case of this wavelength setting will be described with reference to FIG. 9. As illustrated in FIG. 9, an example is given of a case in which six companies A to F as vendors correspond to wavelengths 1528.77 nm to 1566.72 nm and perform management in association with the management numbers #1 to #96.

The companies A and B perform management by associating wavelengths 1566.72 nm to 1528.77 nm from highest to lowest with management numbers #1 to #96 from smallest to largest. On the other hand, the companies C and D perform management by associating wavelengths 1528.77 nm to 1566.72 nm from lowest to highest with management numbers #1 to #96 from smallest to largest.

Further, the company E performs management by associating wavelengths 1528.77 nm to 1566.72 nm which are random from lowest with management numbers #1 to #96 from smallest to largest. The company F performs management by associating random wavelengths 1608.76 nm to 1529.94 nm with management numbers #1 to #96 or higher from smallest to largest.

In this manner, when the management numbers and the wavelengths managed by the six vendors of A to F are the same or different, the operator needs to check six management tables and perform a setting operation to perform the wavelength setting, so that setting wavelength information becomes complicated.

Next, as illustrated in FIG. 10, it is assumed that the vendor V1 performs management by respectively associating wavelengths 11$f$, 12$f$, 13$f$, 14$f$, 15$f$, 16$f$, 17$f$, and 18$f$, which increase by a certain amount (first amount) at a time, with the management numbers #1 to #8, which increase by one at a time. Further, it is assumed that the vendor V2 performs management by respectively associating the wavelengths 11$f$, 13$f$, 15$f$, 17$f$, 19$f$, 21$f$, 23$f$, and 25$f$, which increase by a second amount that is twice the first amount, with the management numbers #1 to #8.

Under this assumption, when the wavelength setting is performed for the communication units 16$a$ and 16$b$ of the buildings 11 and 12 (FIG. 8), the wavelength 12$f$ for the vendor V1, for example, is not commonly available for the vendor V2 because there is no the wavelength 12$f$ in the vendor V2. In this way, only a common wavelength can be set between the vendor V1 and the vendor V2. For example, only wavelengths 11$f$, 13$f$, 15$f$, and 17$f$ surrounded with a dashed line frame may be set. Thus, the operator needs to grasp the wavelength commonly available for both of the vendors V1 and V2 in their communication units 16$a$ and 16$b$, which makes the setting of the wavelength information more complex.

The present disclosure has been made in view of such situations, and an object of the present disclosure is to provide an optical transmission system and a wavelength assignment method in which wavelength information can be easily set in the transmission apparatuses at both bases of the optical fiber such that the required wavelength is assigned to the optical fiber, when the optical transmission system is disaggregated and formed by connecting bases including different transmission apparatuses having specifications of different vendors through the optical fiber.

Means for Solving the Problem

As means for solving the problem, the disclosure according to a first aspect is a disaggregated optical transmission system formed by connecting bases including transmission apparatuses having specifications of different vendors through an optical fiber, the system including a Data Base (DB) configured to store at least information on a network (NW) configuration in which a predetermined optical signal wavelength is assigned to the optical fiber; a wavelength assignment unit configured to, at a time of a wavelength assignment request to the optical fiber between the bases, if the DB stores no information on the same NW configuration as a NW configuration that the wavelength assignment request has, then, based on management numbers of the vendors, wavelengths available for the vendors, and vendor information associated with the wavelengths, associate one of the management numbers with a wavelength commonly available for different vendors, and further if the wavelength associated with the one of the management numbers is assignable to the optical fiber, perform a wavelength assignment instruction by using the one of the management numbers; and a setting unit configured to set wavelength information in the transmission apparatuses at both bases of the optical fiber such that the wavelength according to the wavelength assignment instruction is to be assigned to the optical fiber.

The disclosure according to a third aspect is a wavelength assignment method by a disaggregated optical transmission system formed by connecting bases including transmission apparatuses having specifications of different vendors through an optical fiber, the disaggregated optical transmission system including a DB configured to store at least information on a NW configuration in which a predetermined optical signal wavelength is assigned to the optical fiber, a wavelength assignment unit, and a setting unit, the wavelength assignment method including a step by the wavelength assignment unit of, at a time of a wavelength assignment request to the optical fiber between the bases, if the DB stores no information on the same NW configuration as a NW configuration that the wavelength assignment request has, then based on the management numbers of the vendors, wavelengths available for the vendors, and vendor information associated with the wavelengths, associating one of the management numbers with a wavelength commonly available for different vendors, and further if the wavelength associated with the one of the management numbers is assignable to the optical fiber, performing a wavelength assignment instruction by using the one of the management numbers; and a step by the setting unit of setting wavelength information in the transmission apparatuses at both bases of the optical fiber such that the wavelength according to the wavelength assignment instruction is to be assigned to the optical fiber.

According to this configuration, when the optical transmission system is disaggregated and formed by connecting bases including transmission apparatuses having specifications of different vendors through the optical fiber, wavelength information can be easily set in the transmission apparatuses at both bases of the optical fiber such that the required wavelength is assigned to the optical fiber.

The disclosure according to a second aspect is the optical transmission system according to the first aspect, in which, when the wavelength associated with the management number is not to be assignable to the optical fiber, the wavelength assignment unit repeats determination as to whether a wavelength associated with another one of the management numbers is assignable to the optical fiber, and performs the wavelength assignment instruction by using one of the management numbers that is associated with the wavelength determined to be assignable.

According to this configuration, even when a certain wavelength commonly available for different vendors is not assignable to the optical fiber, another wavelength that can be commonly used in different vendors is assignable to the optical fiber.

Effects of the Invention

According to the present disclosure, it is possible to provide an optical transmission system and a wavelength assignment method in which wavelength information can be easily set in the transmission apparatuses at both bases of the optical fiber such that the required wavelength is assigned to the optical fiber, when the optical transmission system is disaggregated and formed by connecting bases including transmission apparatuses having specifications of different vendors through the optical fiber.

BRIEF DESCRIPTION OF DRAWINGS

FIG. 9 is a diagram of a management table in which companies A to F, vendors, associate wavelengths corresponding to predetermined intervals with management numbers.

DESCRIPTION OF EMBODIMENTS

Hereinafter, an embodiment of the present disclosure will be described with reference to the drawings. Here, in all the drawings of the present specification, components having corresponding functions are denoted by the same reference signs and description will be appropriately omitted.

Configuration of Embodiment

Figure 1:
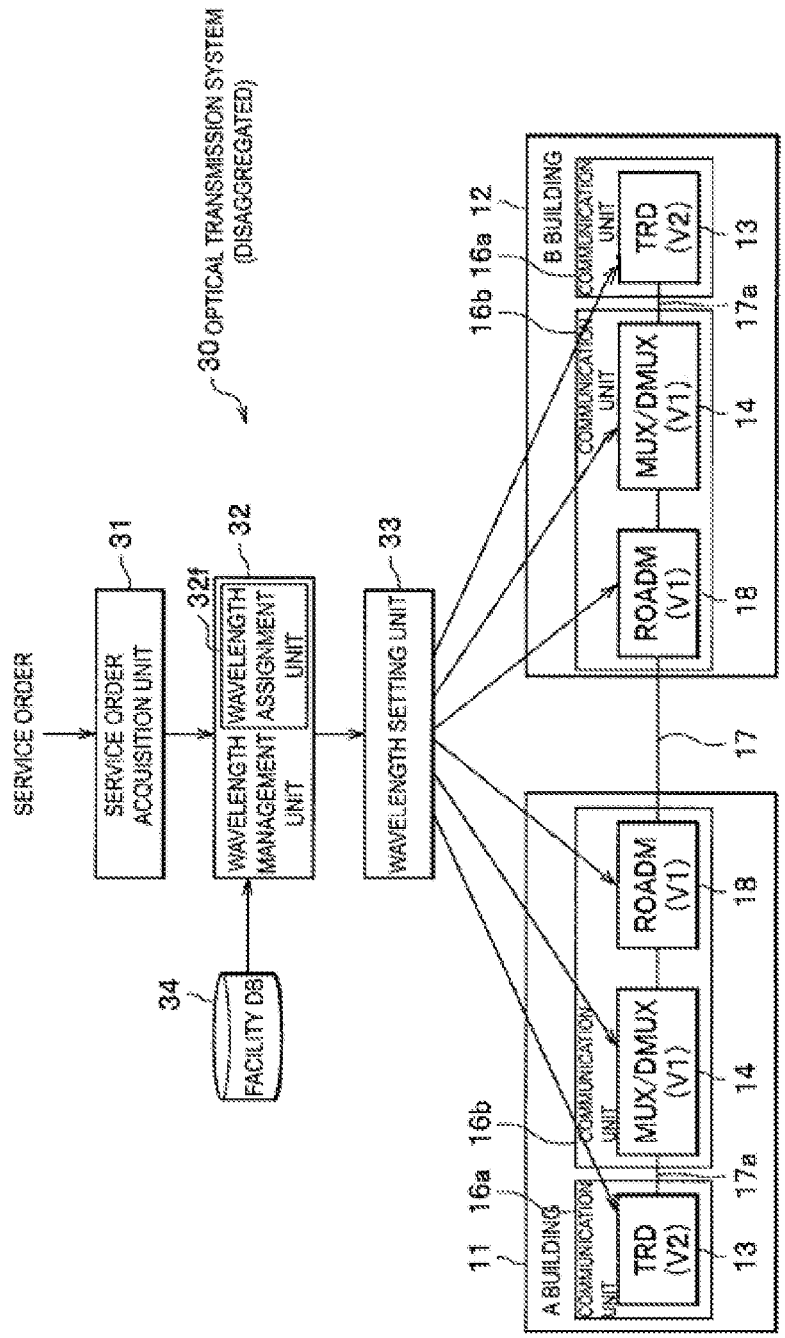
FIG. 1 is a block diagram illustrating a configuration of a disaggregated optical transmission system according to an embodiment of the present disclosure.

FIG. 1 is a block diagram illustrating a configuration of a disaggregated optical transmission system according to an embodiment of the present disclosure.

The disaggregated optical transmission system 30 illustrated in FIG. 1 includes communication units 16a and 16b which are transmission apparatuses having a function required for data transmission (data transmission/reception) via an optical fiber 17, in each of the A building 11 and the B building 12 which are communication bases. The communication unit 16a is equipped with the TRD 13, and the communication unit 16b is equipped with the MUX/DMUX 14 and the ROADM 18.

In addition, the optical transmission system 30 includes a service order acquisition unit (also referred to as an acquisition unit) 31, a wavelength management unit 32, a wavelength setting unit 33, and a facility Data Base (DB) 34. The wavelength management unit 32 includes a wavelength assignment unit 32f that is a characteristic element of the present embodiment. The optical transmission system 30 may be configured to include the acquisition unit 31, the wavelength management unit 32, the wavelength setting unit 33, and the facility DB 34, for example, as a wavelength assignment apparatus.

However, the TRD 13 has different vendor specifications from those of the MUX/DMUX 14 and the ROADM 18 such that the TRD 13 has specifications of a vendor V2, and the MUX/DMUX 14 and the ROADM 18 have specifications of a vendor V1. The facility DB 34 configures a DB according to the aspects.

The acquisition unit 31 is configured based on business support systems (BSS) supporting a business aspect such as user management. This acquisition unit 31 receives and acquires a service order (described below) from a user. The service order is, for example, an application request for a path setting such as assigning and setting a wavelength of 10 GHz to use one optical signal (use one path) having the wavelength in the optical fiber 17 in a section between the ROADM 18 of the A building 11 and the ROADM 18 of the B building 12 (also referred to as a section A-B or between bases).

Figure 2:
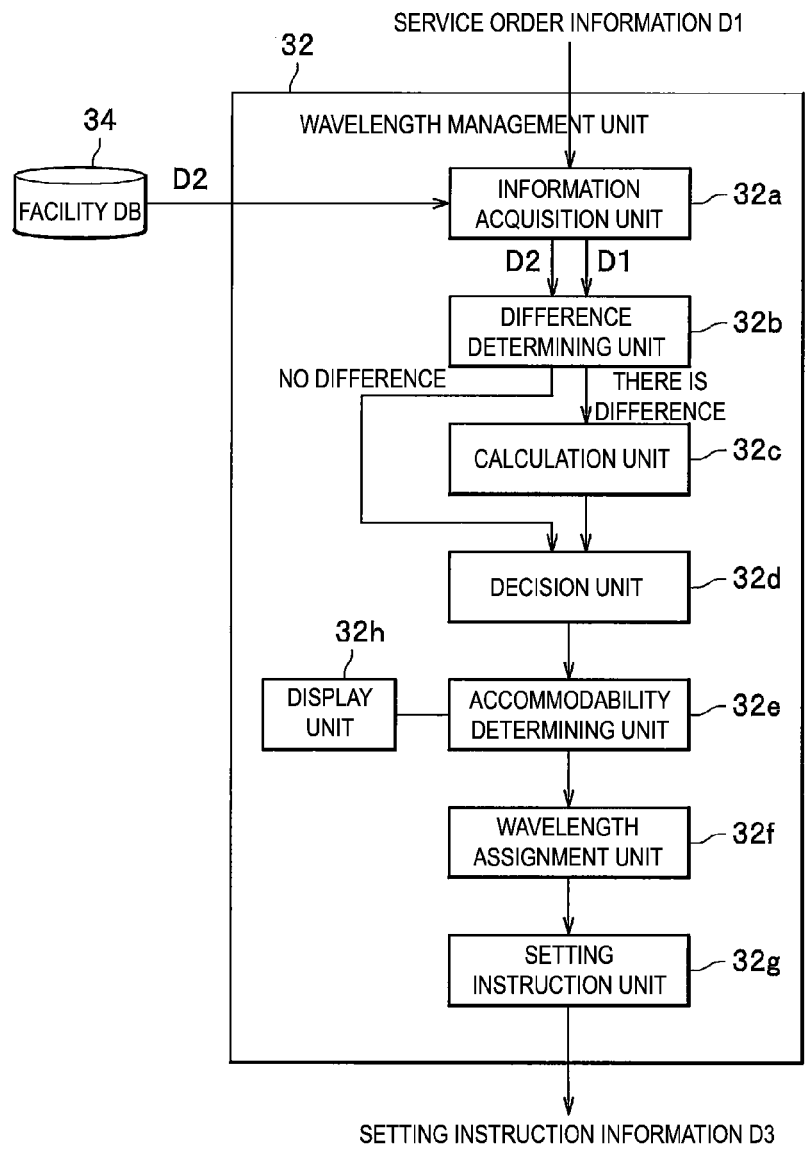
FIG. 2 is a block diagram illustrating a configuration of a wavelength management unit in the disaggregated optical transmission system according to the present embodiment.

The wavelength management unit 32 is configured based on the OSS that supports network operation, and manages the information on the wavelengths for vendors set in the communication unit 16 with the management number such that the required wavelength is assigned to the optical fiber 17 in the section A-B. Further, as illustrated in FIG. 2, the wavelength management unit 32 is configured to include an information acquisition unit 32a, a difference determining unit 32b, a calculation unit 32c, a decision unit 32d, an accommodability determining unit 32e, a wavelength assignment unit 32f, a setting instruction unit 32g, and a display unit 32h.

The information acquisition unit 32a acquires service order information (also referred to as order information) D1 received and acquired by the acquisition unit 31 (FIG. 1) and the DB information D2 stored in the facility DB 34 described below. The DB information D2 includes facility information such as building unique information (for example, the names of the A building 11 and the B building 12 in the optical transmission system 30), floor information, unique information on each transmission apparatuses (for example, the TRD 13, the MUX/DMUX 14, and the ROADM 18), information on ports (described below) of each transmission apparatus, connection information of each transmission apparatus, and information on the number of wavelengths, which are stored in the facility DB 34.

The DB information D2 also includes information on the number of wavelengths as wavelength resources that can be accommodated in the optical fiber 17 in the section A-B. Further, the DB information D2 includes information on pairs of management numbers and wavelengths which are set in the communication units 16a and 16b to be assigned to the optical fiber 17.

The difference determining unit 32b determines whether there is a difference between the number of wavelengths (wavelength resources) requested to be assigned to the optical fiber 17 according to the order information D1 and the number of wavelengths that can be accommodated in the optical fiber 17 according to the DB information D2. When the order information D1 and the DB information D2 have the same number of wavelengths and thus a difference is zero, the difference determining unit 32b determines that there is no difference. Further, when the number of wavelengths of the order information D1 is smaller than the number of wavelengths of the DB information D2, it is determined that there is no difference.

On the other hand, when the number of wavelengths of the order information D1 is larger than the number of wavelengths of the DB information D2, the difference determining unit 32b determines that there is a difference.

When the difference determining unit 32b determines that there is a difference, the calculation unit 32c calculates the number of wavelengths required for each transmission apparatus to obtain the number of wavelengths (wavelength resources) that can be accommodated in the optical fiber based on the order information D1, as follows. That is, the calculation unit 32c, first, acquires the unique information of each of the communication units 16a and 16b, which are transmission apparatus, and aggregates the number of transmission apparatuses for each transmission apparatus. Next, the calculation unit 32c acquires the connection configuration of each transmission apparatus. Next, the calculation unit 32c acquires the ports of each transmission apparatus and aggregates the number of ports. Next, the calculation unit 32c aggregates the number of wavelengths of each transmission apparatus.

That is, the calculation unit 32c calculates the number of wavelengths required for each transmission apparatus based on the order information D1 to obtain, for example, 16 wavelengths that can be accommodated in the optical fiber in the section A-B by using 16 TRDs. In this case, first, the calculation unit 32c aggregates the numbers of TRDs, MUXs/DMUXs, and ROADMs as transmission apparatuses required to obtain 16 wavelengths based on the order information D1. Next, the calculation unit 32c obtains the connection configuration of the TRDs, the MUX/DMUXs, and the ROADM the numbers of which have been aggregated. Next, the calculation unit 32c aggregates the number of ports of the TRDs, the MUX/DMUXs, and the ROADM used in the connection configuration.

Next, the calculation unit 32c calculates the number of wavelengths that can be accommodated in the TRDs, the MUX/DMUXs, and the ROADM, based on the aggregated number of ports. Thus, for example, 16 wavelengths of the TRDs, 32 wavelengths of the MUX/DMUXs, and 32 wavelengths of the ROADM are calculated. In accordance with 16 wavelengths of the TRDs that are the smallest among the calculated numbers of wavelengths, 16 wavelengths that can be accommodated in the optical fiber 17 of the section A-B are determined.

The decision unit 32d decides, as wavelength resources, the number of wavelengths of each transmission apparatus and the number of wavelengths of the optical fiber 17 in the section A-B, calculated by the calculation unit 32c. However, in a case where the difference determining unit 32b determines that there is no difference, the decision unit 32d decides the current wavelength resources represented by the DB information D2.

The accommodability determining unit 32e determines whether the number of wavelengths of each transmission apparatus decided by the decision unit 32d and the number of wavelengths of the optical fiber 17 in the section A-B can be accommodated in each transmission apparatus in the present state included in the DB information D2 and the optical fiber 17 in the section A-B.

For example, when it is determined that the number of wavelengths of each transmission apparatus decided by the decision unit 32d can be accommodated in each transmission apparatus in the present state included in the DB information D2, and when it is assumed that the maximum number of wavelengths that can be accommodated in the optical fiber 17 is 16, among the 16 wavelengths, 12 wavelengths relating to the DB information D2 are in use and the accommodation equivalent to four wavelengths remain unused. Thus, the difference determining unit 32b has already determined that there is a difference of four wavelengths, so that the four wavelengths can be accommodated in the remaining four wavelength bands of the optical fiber 17.

On the other hand, when each number of wavelengths decided by the decision unit 32d is a number of wavelengths when the difference determining unit 32b determines that there is no difference, it is determined that the wavelengths can be accommodated.

When each number of wavelengths decided by the decision unit 32d exceeds the number of wavelengths of the transmission apparatus in the present state and the number of wavelengths that can be accommodated in the optical fiber 17 between the bases, the accommodability determining unit 32e displays information indicating installation of additional transmission apparatuses corresponding to the excess number of wavelengths on a display unit 32h. A system administrator checks this display and installs additional transmission apparatuses. When the additional transmission apparatuses are installed, the number of wavelengths that can be accommodated in the optical fiber 17 between the bases also increases, so that it is possible to assign the decided number of wavelengths (wavelength resources).

When it is determined by the accommodability determining unit 32e that the number of wavelengths can be accommodated in the optical fiber 17, the wavelength assignment unit 32f performs an instruction of setting wavelength information in the communication units 16a and 16b which are transmission apparatuses such that the required wavelength is assigned to the optical fiber 17. The process for performing the instruction is described in detail below with reference to Operations in Embodiment.

The setting instruction unit 32g outputs to the setting unit 33 (FIG. 1), setting instruction information D3 which issues the wavelength setting instruction for the wavelength assignment of the wavelength assignment unit 32f.

The setting unit 33 illustrated in FIG. 1 sets wavelengths corresponding to the setting instruction information D3 in the communication units 16a and 16b which are the corresponding transmission apparatuses such that the required wavelength is assigned to the optical fiber 17 between the bases based on the order information D1.

Operations in Embodiment

Next, operations when setting the wavelength information in the communication units 16a and 16b such that the required wavelength is assigned to the optical fiber 17 in the section A-B in the optical transmission system 30 according to the present embodiment will be described with reference to the flowcharts of FIGS. 3 and 4.

Figure 3:
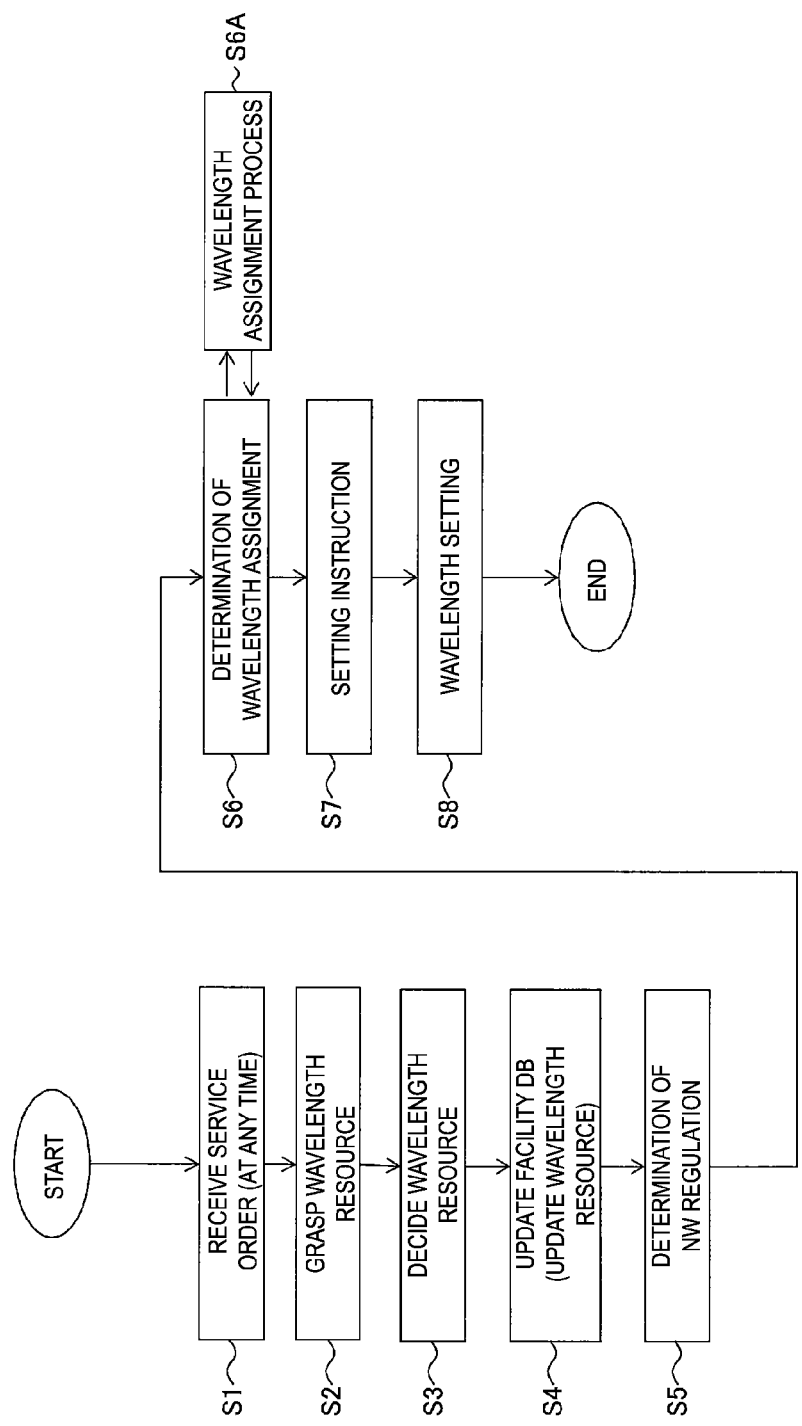
FIG. 3 is a flowchart illustrating operations performed when setting wavelength information in a communication unit such that a required wavelength is assigned to an optical fiber in a section A-B in the optical transmission system according to the present embodiment.

In step S1 illustrated in FIG. 3, it is assumed that the acquisition unit 31 (FIG. 1) has received a service order and has output the received order information D1 to the information acquisition unit 32a of the wavelength management unit 32 (FIG. 2). However, it is assumed that the order information D1 is a path setting request information for assigning one or a plurality of wavelengths (wavelength resources) of the optical signal required for the optical fiber in the A-B section.

In step S2, the wavelength management unit 32 performs the process of grasping the wavelength resource (wavelength λ1) as follows. First, the information acquisition unit 32a acquires the DB information D2 described above from the facility DB 34, and outputs this DB information D2 and the order information D1 to the difference determining unit 32b. The difference determining unit 32b grasps whether there is a difference in the numbers of wavelengths that are assignable to the optical fiber between the order information D1 and the DB information D2. In this case, when there is a difference where the order information D1 has one more wavelength than the DB information D2 has, the calculation unit 32c starts to calculate the number of wavelengths required for each transmission apparatus to obtain the number of wavelengths that can be accommodated in the optical fiber in the section A-B based on the order information D1. However, since the path by the optical fiber in the section A-B is present in addition to the optical fiber 17 illustrated in FIG. 1, the reference sign of the optical fiber is not currently specified.

In this calculation, first, the calculation unit 32c aggregates the number of each of TRDs, MUX/DMUXs, and ROADMs required for obtaining one wavelength based on the order information D1. The connection configuration of this aggregated TRD, MUX/DMUX, and ROADM is obtained, and the number of ports of TRD, MUX/DMUX, and ROADM used in this connection configuration is aggregated. Further, the calculation unit 32c calculates the number of wavelengths required for the TRDs, the MUX/DMUXs, and the ROADM for obtaining the number of wavelengths (wavelength resources) that can be accommodated in the optical fiber in the section A-B, based on the aggregated number of ports. This allows the wavelengths of the TRD, the MUX/DMUX, and the ROADM to be calculated, and the number of wavelengths (for example, one wavelength) that can be accommodated in the optical fiber in the section A-B is determined.

Thereafter, in step S3, the decision unit 32d decides the number of wavelengths (the number of wavelengths=1) calculated in step S2 above as the wavelength resource.

Next, in step S4, the wavelength resource (the number of wavelengths) of the DB information D2 stored in the facility DB 34 is updated. In other words, in a case where accommodability determining unit 32e determined that the one wavelength decided by the decision unit 32d can be accommodated by each transmission apparatus in the present state included in the DB information D2 and the optical fiber in the section A-B, the wavelength assignment unit 32f updates the DB information D2 in the facility DB 34 to the wavelength resource decided by the decision unit 32d. Note that when the wavelength cannot be accommodated in the optical fiber 17, the number of TRD, MUX/DMUX, and ROADM in the communication units 16a and 16b is increased to accommodate the one wavelength.

Next, in step S5, the wavelength management unit 32 determines the network (NW) regulation. In other words, the wavelength management unit 32 determines the passage route of the plurality of optical fibers. In this example, the passage route is determined to be the optical fiber 17 in the section A-B (FIG. 1).

Next, in step S6, the wavelength management unit 32 determines the wavelength to be assigned to the optical fiber 17. This is determined in step S6A by the wavelength assignment unit 32f performing the wavelength assignment process. This wavelength assignment process will be described with reference to the flowchart of FIG. 4.

In step S11 of FIG. 4, the wavelength assignment unit 32f checks the NW configuration as follows. That is, the wavelength assignment unit 32f searches the NW configuration information stored in the facility DB 34 in response to the wavelength assignment request (order information D1), and checks the NW configuration according to the optical fiber 17 in the same section A-B as the NW configuration of the wavelength assignment request.

That is, in step S12, the wavelength assignment unit 32f determines whether there is information on the same NW configuration as the NW configuration of the wavelength assignment request by the order information D1 in the facility DB 34. If there is the same NW configuration, the process proceeds to step S19 described below.

If there is no same NW configuration, in step S13, the wavelength assignment unit 32f acquires vendor information from the vendor wavelength management information D5. This vendor information includes the vendor management number (#x), available wavelength (nm), and frequency (GHz) corresponding to the wavelength. This vendor information is acquired by the wavelength assignment unit 32f Note that the vendor wavelength management information D5 is acquired from the vendor and stored in a storage unit (not illustrated).

Figure 4:
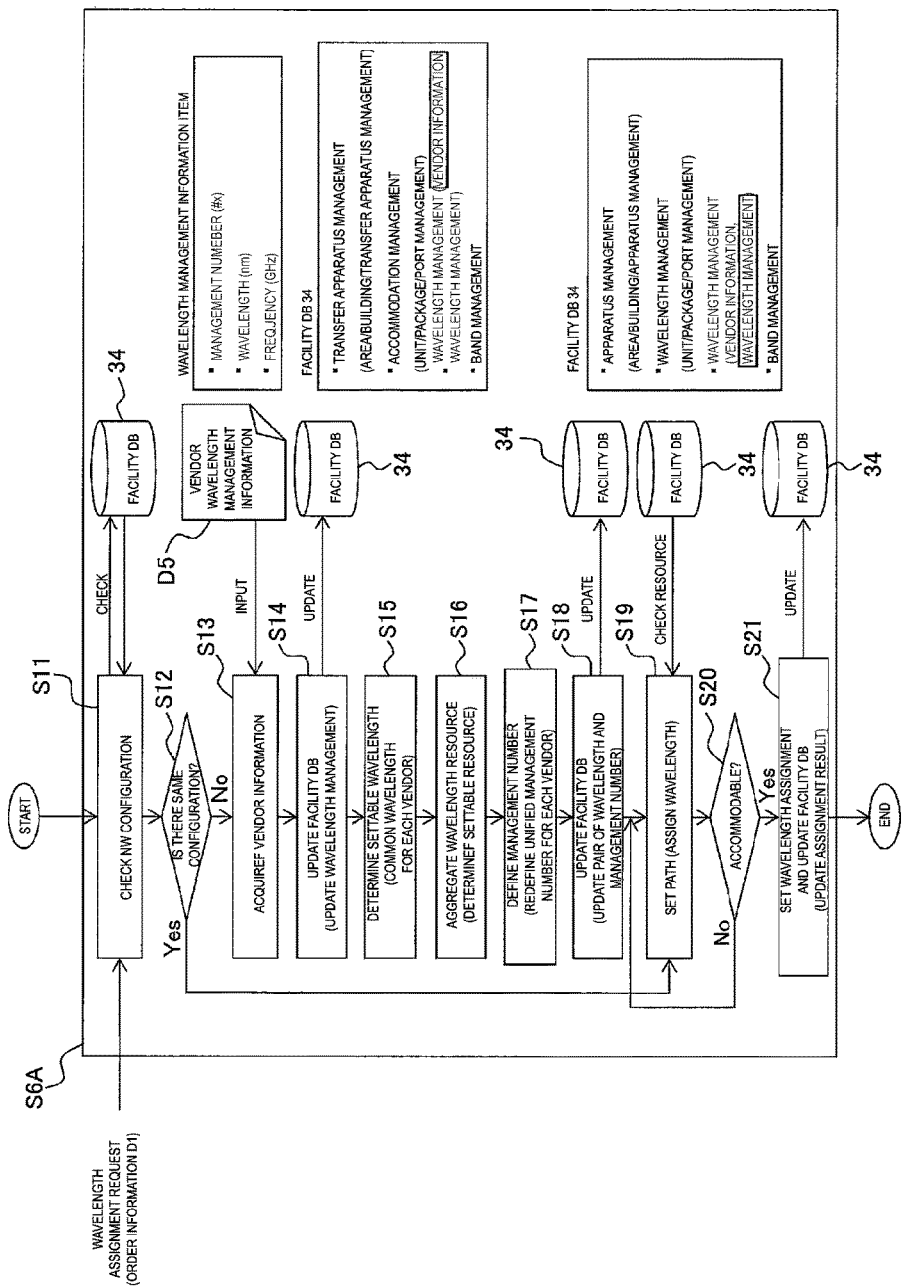
FIG. 4 is a flowchart illustrating an operation of a wavelength assignment process in the optical transmission system according to the present embodiment.
Figure 5:
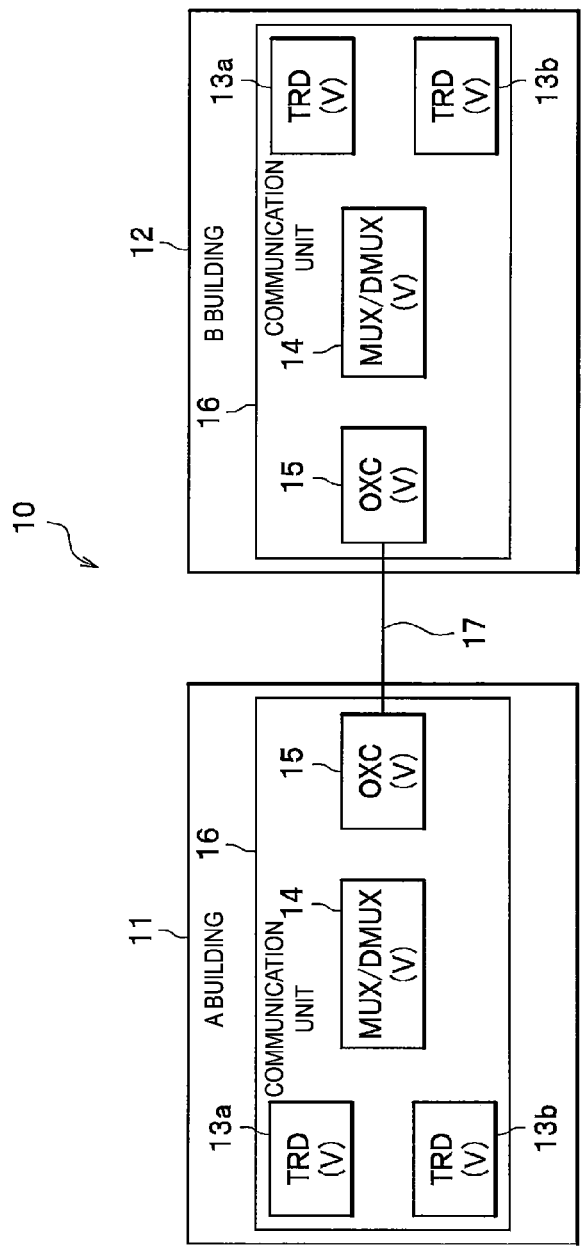
FIG. 5 is a block diagram illustrating a configuration of an all-in-one optical transmission system in the related art.
Figure 6:
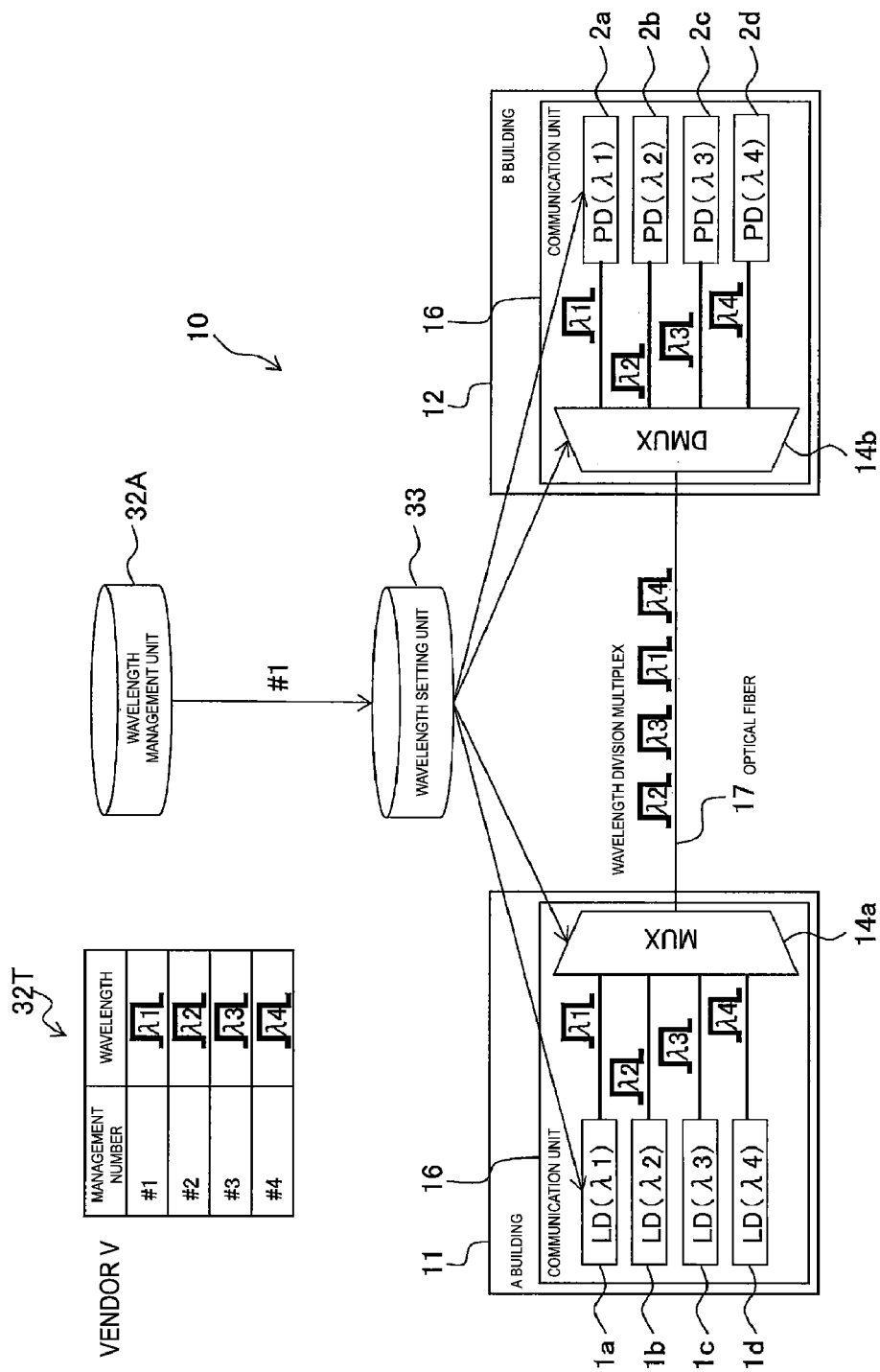
FIG. 6 is a block diagram illustrating a configuration which manages wavelengths of a plurality of optical signals to be transmitted to an optical fiber of the all-in-one optical transmission system in the related art.
Figure 7:
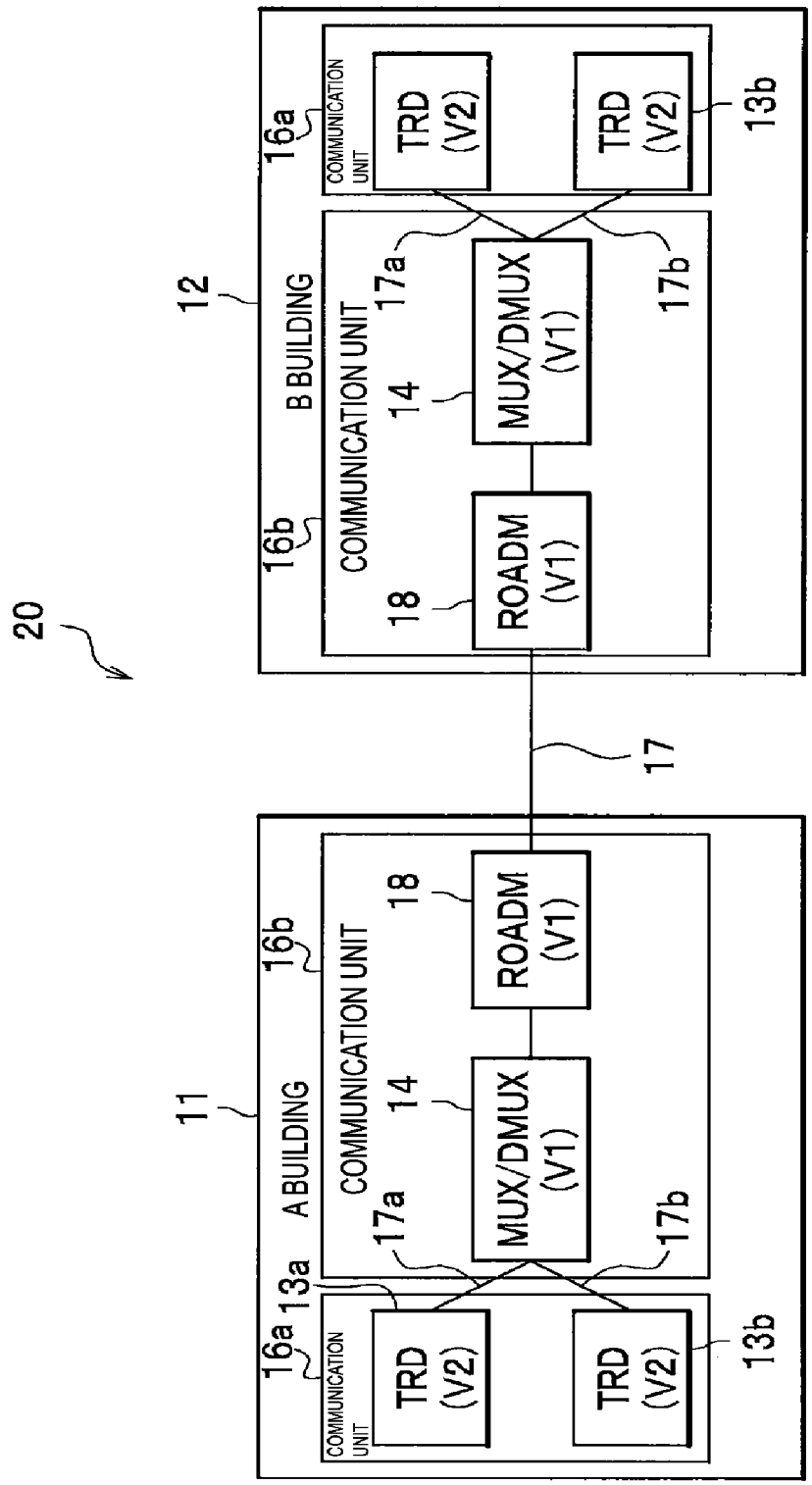
FIG. 7 is a block diagram illustrating a configuration of a disaggregated optical transmission system of the related art.
Figure 8:
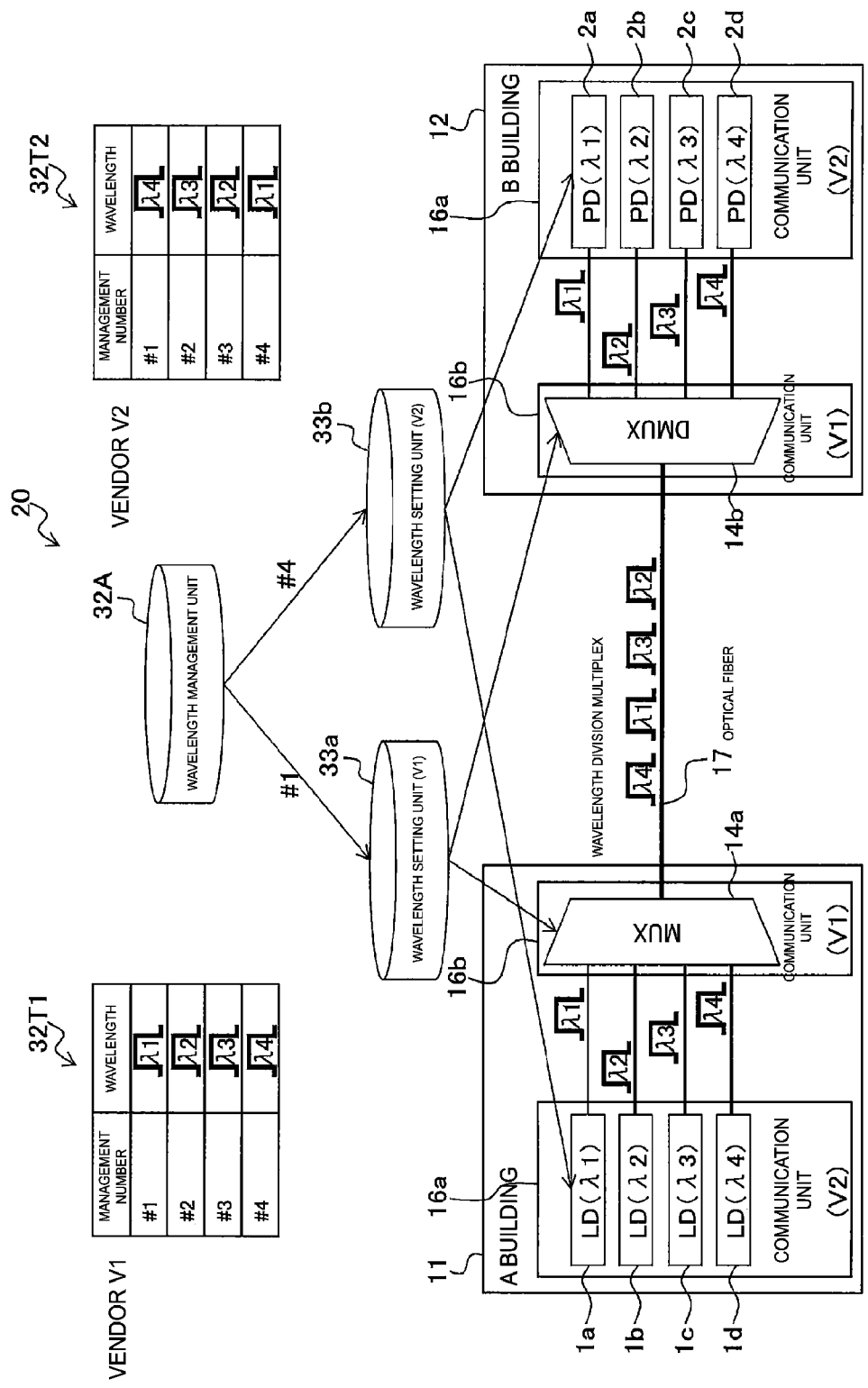
FIG. 8 is a block diagram illustrating a configuration which manages wavelengths of a plurality of optical signals to be transmitted to an optical fiber of the disaggregated optical transmission system of the related art.

In step S14, the wavelength assignment unit 32f updates the vendor information in the facility DB 34 with the vendor information acquired in step S13 (as indicated by being surrounded by a circle within the facility DB 34 in FIG. 4). The facility DB 34 stores information for performing transfer apparatus management, accommodation management, wavelength management, and band management, to be described below.

The transfer apparatus management is to manage transfer apparatuses (communication units 16a and 16b) installed inside a building to be managed. The accommodation management is to manage units (for example, communication units 16a and 16b) in which a package (for example, the TRD 13, the MUX/DMUX 14, and the ROADM 18) that includes communication devices configuring a transfer apparatus is accommodated, the package, and the ports of the package. The wavelength management is to manage wavelengths by using vendor information on each vendor. For example, a wavelength λ1 corresponding to 1500 nm is managed with the management number #1. The band management is to manage which band is in use by the optical fiber, such as 10 GHz.

Figure 10:
FIG. 10 is a diagram of a management table in which management numbers are associated with wavelengths corresponding to predetermined intervals of each vendor.

In step S15, the wavelength assignment unit 32f determines the wavelength that can be set to the transfer apparatus as follows. That is, the wavelength assignment unit 32f determines wavelengths that can be set to the communication units 16a and 16b of the buildings 11 and 12 connected by the optical fiber 17 (FIG. 1). For example, as in the management table 32T3 illustrated in FIG. 10, the vendor V1 performs management by respectively associating wavelengths 11f, 12f, 13f, 14f, 15f, 16f, 17f, and 18f, which increase by a certain amount (first amount) at a time, with the management numbers #1 to #8, which increase by one at a time. It is assumed that the vendor V2 performs management by respectively associating the wavelengths 11f, 13f, 15f, 17f, 19f, 21f, 23f, and 25f, which increase by a second amount that is twice the first amount, with the management numbers #1 to #8.

Under this assumption, the wavelengths which are used in common by the vendors V1 and V2 correspond to the wavelengths 11f, 13f, 15f, and 17f surrounded with the dashed line frame. Thus, the wavelength assignment unit 32f determines that wavelengths commonly available for the communication units 16a and 16b are wavelengths corresponding to 11f, 13f, 15f, and 17f, as illustrated in the frame line of FIG. 10.

Next, in step S16, the wavelength assignment unit 32f performs wavelength resource aggregation. In other words, aggregation is performed to assign the determined wavelengths 11f, 13f, 15f, and 17f as the wavelengths that are assignable to the optical fiber 17.

In step S17, the wavelength assignment unit 32f defines the management numbers for the aggregated wavelengths 11f, 13f, 15f, and 17f as follows. In other words, the wavelength assignment unit 32f defines the wavelength 11f in association with the management number #1, the wavelength 13f in association with the management number #2, the wavelength 15f in association with the management number #3, and the wavelength 17f in association with the management number #4.

In step S18, the wavelength assignment unit 32f writes the pairing information (information on wavelength management) in which the above-defined wavelengths 11f, 13f, 15f, and 17f are associated with the management numbers #1, #2, #3, and #4 in the facility DB 34 and stores or overwrites the information to update the information. The pairing information is information on the wavelength management surrounded with the frame in the facility DB 34.

Next, in step S19, the wavelength assignment unit 32f performs the path setting or wavelength assignment as follows. In other words, in a case where one path (wavelength λ1) is requested at a time of a wavelength assignment request according to the order information D1, the wavelength assignment unit 32f dispenses the wavelength 11f (=wavelength λ1) corresponding to the management number #1 from the facility DB 34, and sets this wavelength 11f as a candidate for assignment to the optical fiber 17.

Next, in step S20, the wavelength assignment unit 32f determines whether the wavelength 11f of the assignment candidate can be accommodated in the optical fiber 17. Here, when the wavelength 11f is the wavelength 11f of the management number #1 newly created in the above step S19, the wavelength 11f can be accommodated, so that it is determined that the wavelength 11f can be accommodated (assignable).

In this case, in step S21, the wavelength assignment unit 32f determines that the information on the wavelength 11f of the management number #1 is to be set in the communication units 16a and 16b and assigned to the optical fiber 17. The use of the determined information of a pair of the management number #1 and the wavelength 11f is written to the facility DB 34.

On the other hand, in the above step S20, in a case where it is determined that the wavelength 11f of the assignment candidate cannot be accommodated in the optical fiber 17, the wavelength assignment unit 32f returns to step S19, and dispenses the wavelength 13f (see FIG. 10) corresponding to the next management number #2 from the facility DB 34, and sets this wavelength 13f as a candidate for assignment to the optical fiber 17. Thereafter, in step S20, the process of step S19 is performed until the wavelength assignment unit 32f determines that the candidate wavelength can be accommodated in the optical fiber 17.

With such a wavelength assignment process, the wavelength assignment to the optical fiber 17 in the wavelength management unit 32 in step S6 in FIG. 3 is determined. Here, it is assumed that the assignment of the wavelength 11f of the management number #1 has been determined.

Next, in step S7, the setting instruction unit 32g (FIG. 2) of the wavelength management unit 32 outputs the setting instruction information D3 (FIG. 2) including the management number #1 of the wavelength 11f determined in the above step S6 to the setting unit 33 (FIG. 1). However, the setting instruction information D3 may be only the management number #1.

The wavelength setting unit 33 refers to the facility DB 34 to search for the wavelength 11f associated with the management number #1, when the management number #1 is input from the wavelength management unit 32A. The wavelength setting unit 33 sets the information on the wavelength 11f in the communication units 16a and 16b of the A and B buildings 11 and 12 such that the retrieved wavelength 11f is assigned to the optical fiber 17. In other words, the wavelength setting unit 33 sets the information on the wavelength 11f to the TRD 13 of the communication unit 16a and the MUX/DMUX 14 and ROADM 18 of the communication unit 16b. With this setting, a wavelength 11f is assigned to the optical fiber 17 in the section A-B, which allows communication with the optical signal of the assigned wavelength 11f.

Effects of Embodiment

Effects of the wavelength assignment in the optical transmission system 30 according to the present embodiment will be described. The optical transmission system 30 is a disaggregated optical transmission system formed by connecting bases including transmission apparatuses (communication units 16a and 16b) having specifications of different vendors through the optical fiber 17. This optical transmission system 30 is characterized by being configured as follows.

(1) The optical transmission system 30 is configured to include a facility DB 34, a wavelength assignment unit 32f, and a setting unit 33.

The facility DB 34 stores at least information on the NW configuration in which a predetermined optical signal wavelength is assigned to the optical fiber 17.

At a time of a wavelength assignment request to the optical fiber 17 between bases, if the facility DB 34 stores no information on the same NW configuration as the NW configuration that the wavelength assignment request has, the wavelength assignment unit 32f associates a management number with a wavelength commonly available for different vendors, based on management numbers of vendors, wavelengths available to the vendors, and the vendor information associated with the wavelengths. Further if the wavelength associated with the management number is assignable to the optical fiber 17, the wavelength assignment unit 32f performs a wavelength assignment instruction by using the management number.

The setting unit 33 performs setting of wavelength information in transmission apparatuses at both bases of the optical fiber 17 such that a wavelength according to the wavelength assignment instruction is assigned to the optical fiber 17.

According to this configuration, in the disaggregated optical transmission system 30 formed by connecting bases including transmission apparatuses having specifications of different vendors through the optical fiber 17, wavelength information can be easily set in the transmission apparatuses at both bases of the optical fiber 17 such that the required wavelength is assigned to the optical fiber 17.

(2) The wavelength assignment unit 32f is configured to, when the wavelength associated with the management number is not to be assignable to the optical fiber 17, repeat determination as to whether a wavelength associated with another management number is assignable to the optical fiber 17, and perform a wavelength assignment instruction by using a management number associated with a wavelength determined to be assignable.

According to this configuration, even when a certain wavelength commonly available for different vendors is not assignable to the optical fiber 17, other wavelength commonly available for different vendors is assignable to the optical fiber 17.

In addition, a specific configuration can be appropriately changed without departing from the gist of the present disclosure.

REFERENCE SIGNS LIST

11 A building
12 B building
13 TRD
14 MUX/DMUX
17 Optical fiber
18 ROADM
31 Service order acquisition unit
32 Wavelength management unit
33 Wavelength setting unit
34 Facility DB
32a Information acquisition unit
32b Difference determining unit
32c Calculation unit
32d Decision unit
32e Accommodability determining unit
32f Wavelength assignment unit
32g Setting instruction unit
32h Display unit
D1 Service order information (order information)
D2 DB information
D3 Setting instruction information

The invention claimed is:

1. A disaggregated optical transmission system formed by connecting bases including transmission apparatuses having specifications of different vendors through an optical fiber, the system comprising:
   a Data Base (DB) configured to store at least information on a network (NW) configuration in which a predetermined optical signal wavelength is assigned to the optical fiber;
   a wavelength assignment unit, including one or more processors, configured to, at a time of a wavelength assignment request to the optical fiber between the bases, if the DB stores no information on the same NW configuration as a NW configuration that the wavelength assignment request has, then, based on management numbers of the vendors, wavelengths available for the vendors, and vendor information associated with the wavelengths, associate one of the management numbers with a wavelength commonly available for different vendors, and further if the wavelength associated with the one of the management numbers is assignable to the optical fiber, perform a wavelength assignment instruction by using the one of the management numbers; and
   a setting unit, including one or more processors, configured to set wavelength information in the transmission apparatuses at both bases of the optical fiber such that the wavelength according to the wavelength assignment instruction is to be assigned to the optical fiber.

2. The disaggregated optical transmission system according to claim 1,
   wherein, when the wavelength associated with the management number is not to be assignable to the optical fiber, the wavelength assignment unit is configured to repeat determination as to whether a wavelength associated with another one of the management numbers is assignable to the optical fiber, and perform the wavelength assignment instruction by using one of the management numbers that is associated with the wavelength determined to be assignable.

3. A wavelength assignment method by a disaggregated optical transmission system formed by connecting bases including transmission apparatuses having specifications of different vendors through an optical fiber,
   the disaggregated optical transmission system including a DB configured to store at least information on a NW configuration in which a predetermined optical signal wavelength is assigned to the optical fiber, a wavelength assignment unit including one or more processors, and a setting unit including one or more processors,
   the wavelength assignment method comprising:
   a step by the wavelength assignment unit of, at a time of a wavelength assignment request to the optical fiber between the bases, if the DB stores no information on the same NW configuration as a NW configuration that the wavelength assignment request has, then based on the management numbers of the vendors, wavelengths available for the vendors, and vendor information associated with the wavelengths, associating one of the management numbers with a wavelength commonly available for different vendors, and further if the wavelength associated with the one of the management numbers is assignable to the optical fiber, performing a wavelength assignment instruction by using the one of the management numbers; and
   a step by the setting unit of setting wavelength information in the transmission apparatuses at both bases of the optical fiber such that the wavelength according to the wavelength assignment instruction is to be assigned to the optical fiber.

4. The wavelength assignment method according to claim 3, further comprising:
   when the wavelength associated with the management number is not to be assignable to the optical fiber, repeating, by the wavelength assignment unit, determination as to whether a wavelength associated with another one of the management numbers is assignable to the optical fiber, and performing, by the wavelength assignment instruction by using one of the management numbers that is associated with the wavelength determined to be assignable.

* * * * *